UNITED STATES PATENT OFFICE.

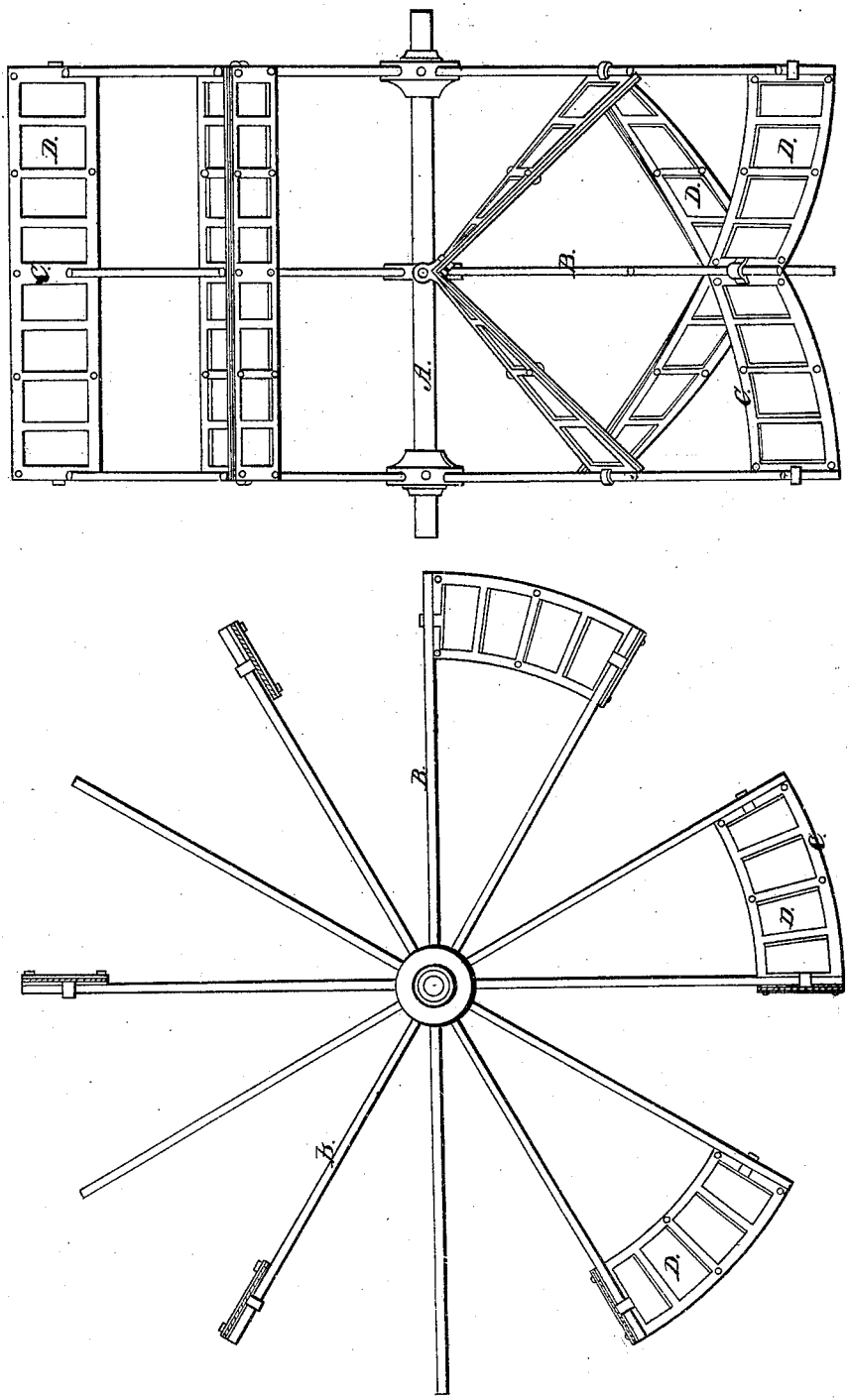

AMZI C. SEMPLE, OF CINCINNATI, OHIO.

IMPROVEMENT IN PADDLES FOR VESSELS.

Specification forming part of Letters Patent No. 9,834, dated July 5, 1853.

*To all whom it may concern:*

Be it known that I, AMZI C. SEMPLE, of the city of Cincinnati, in the county of Hamilton and the State of Ohio, have invented a new and Improved Float for Propelling Vessels or Machinery; and I do hereby declare that the following is a full and exact description thereof, reference being had to the accompanying drawings and to the letters of reference marked thereon.

It is a well-known fact in the propulsion of vessels that each float of the paddle-wheel, when made of a solid or non-elastic substance in the usual way, produces on entering the water a violent jar to the vessel and machinery, thereby doing great injury to and impairing the durability of both and rendering the motion of the boat uncomfortable and disagreeable to passengers, wastes power by a rapid succession of concussions, and impairs to some extent the speed of the vessel. Many attempts have been made to obviate the difficulty by feathering the paddles, placing them in an angular position, &c.; but much of the objections complained of still remain to be overcome. Much power is also lost by striking the water flatwise, or partially so, when the floats come in contact with it, which produces an injurious jar, but does little toward propelling the vessel. This last difficulty has to some extent been obviated by feathering the floats by a very complicated arrangement, so expensive and difficult to keep in repairs that it soon went out of use. The floats have also been placed in a permanent feathered position; but this does nearly as much harm in lifting the water on coming out as is gained by the better manner of entering. This, also, is scarcely, if at all, in use, and neither of these modes, nor any other with which I am acquainted, has obviated the difficulty above mentioned, or, on the whole, approximated a remedy, without introducing evils and inconveniences at least as great as they have removed.

The object of my invention is to avoid the shock above alluded to, as also the difficulty of the float entering flatwise, and to present a surface of float to which the water will adhere when in operation better than to any float hitherto known, and this without the disadvantages which have heretofore attended every attempt to remedy the evil in question, and, indeed, without any inconveniences except such as are incident to every practical paddle-wheel in coming out of the water.

To accomplish my object, instead of making my floats of the ordinary inelastic substances, I make a grated frame for each float and confine in this frame a plate or plates of vulcanized india-rubber to work against the water.

Other similarly elastic and durable substances may be used instead of india-rubber; but I prefer the latter.

In constructing my floats I prefer to clamp the plates of rubber between two frames, one of the frames and the plates of india-rubber being in sections or in one piece, as shown in the drawings. The bars across the frames serve to give additional support to the plates of rubber. The bars and frames being fluted on the inside, these flutes, closing on the welts or cords in the edges of the plates of rubber, will hold the latter firm.

In the accompanying drawings, A is the axis of the paddle-wheel; B, the arms; C, the grate-formed frames, and D the plates of vulcanized india-rubber clamped between them in any secure and convenient way.

The exact mode of connecting and supporting the parts of the floats is immaterial; but I prefer what I have described.

In operation when the float strikes the water the plates of india-rubber will yield, obviating the shock. On the lower part of the float entering the water it will receive such a form by pressure against the water as to enter nearly edgewise. The dishing form given to the india-rubber by pressure against the water will continue during active service of the float, and that form, together with bars across the face of the float, will better prevent the slipping of the water from the float than any form hitherto used, and when the float rises out of the water it will resume its flat form, and the water will fall from it or be thrown out from it by the reaction of the rubber with greater ease and more perfectly than from any other float known. Thus the advantages so long sought in vain are attained by this simple contrivance without any countervailing objections. The degree of elasticity and the thickness of the plate or sheets of india-rubber used cannot be defined, but must depend in each case upon the powers to be exerted by the wheel.

What I claim as my invention, and desire to secure by Letters Patent, is—

The use of vulcanized india-rubber or other similarly elastic substances which will produce the intended effect in the construction of floats of paddle-wheels, for the purpose and in the manner herein described.

A. C. SEMPLE.

Witnesses:
 MITCHEL ANCKER,
 GEO. F. GILBERT.